Dec. 29, 1953  B. A. BROWN ET AL  2,664,018
MACHINE FOR OPERATING ON BRIQUETTES
Filed Aug. 18, 1950  2 Sheets-Sheet 2
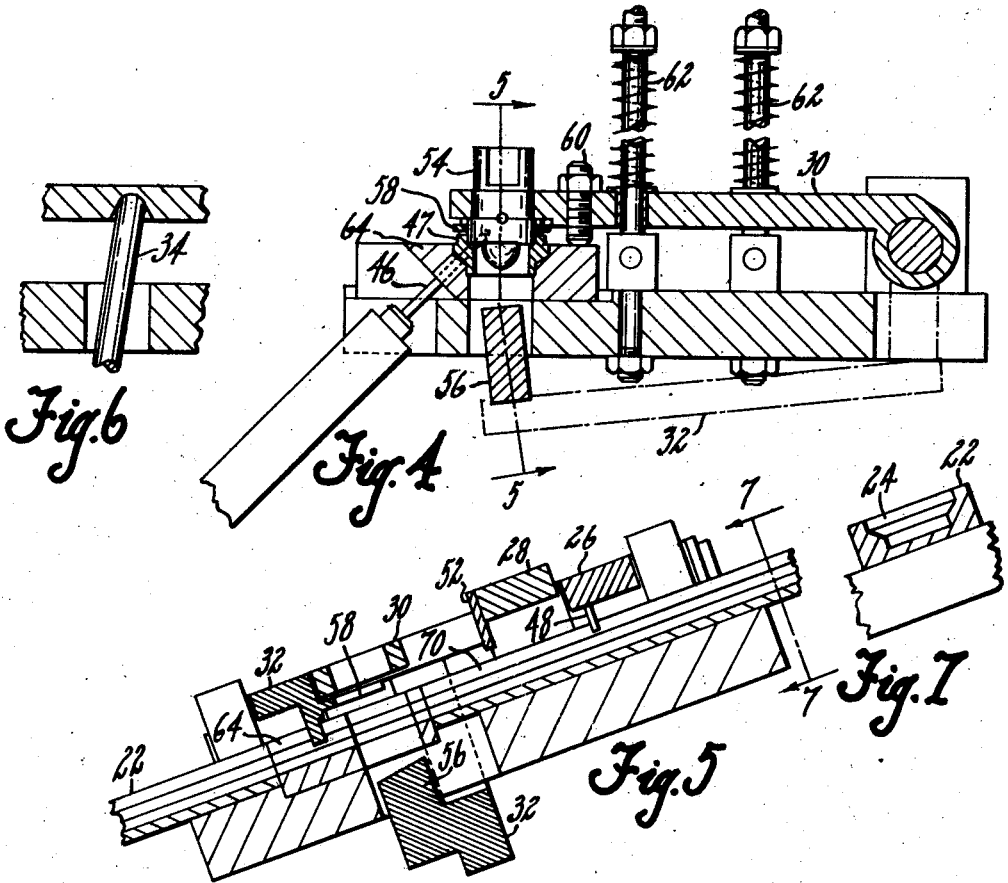
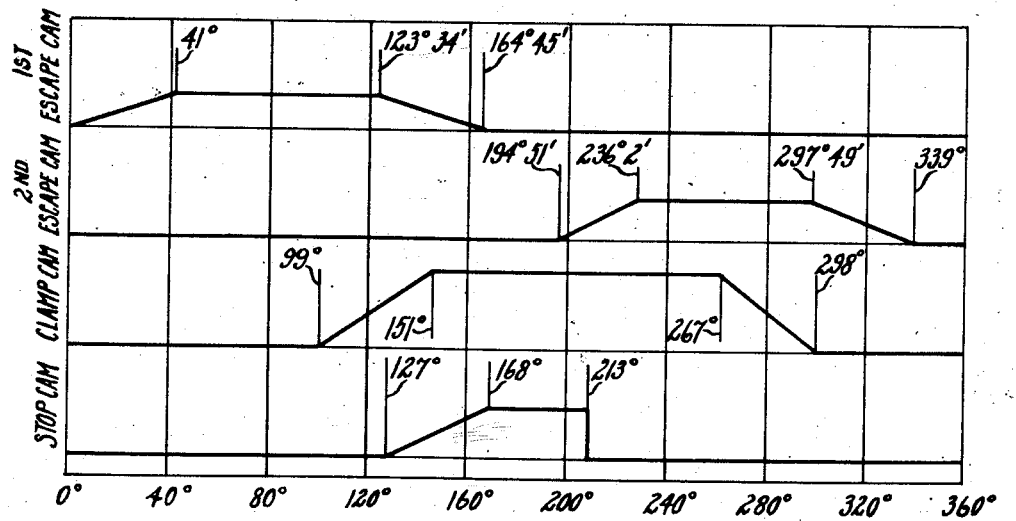
INVENTORS
BERNARD A. BROWN AND LEONARD A. ERICKSON
BY
THEIR ATTORNEYS Patented Dec. 29, 1953

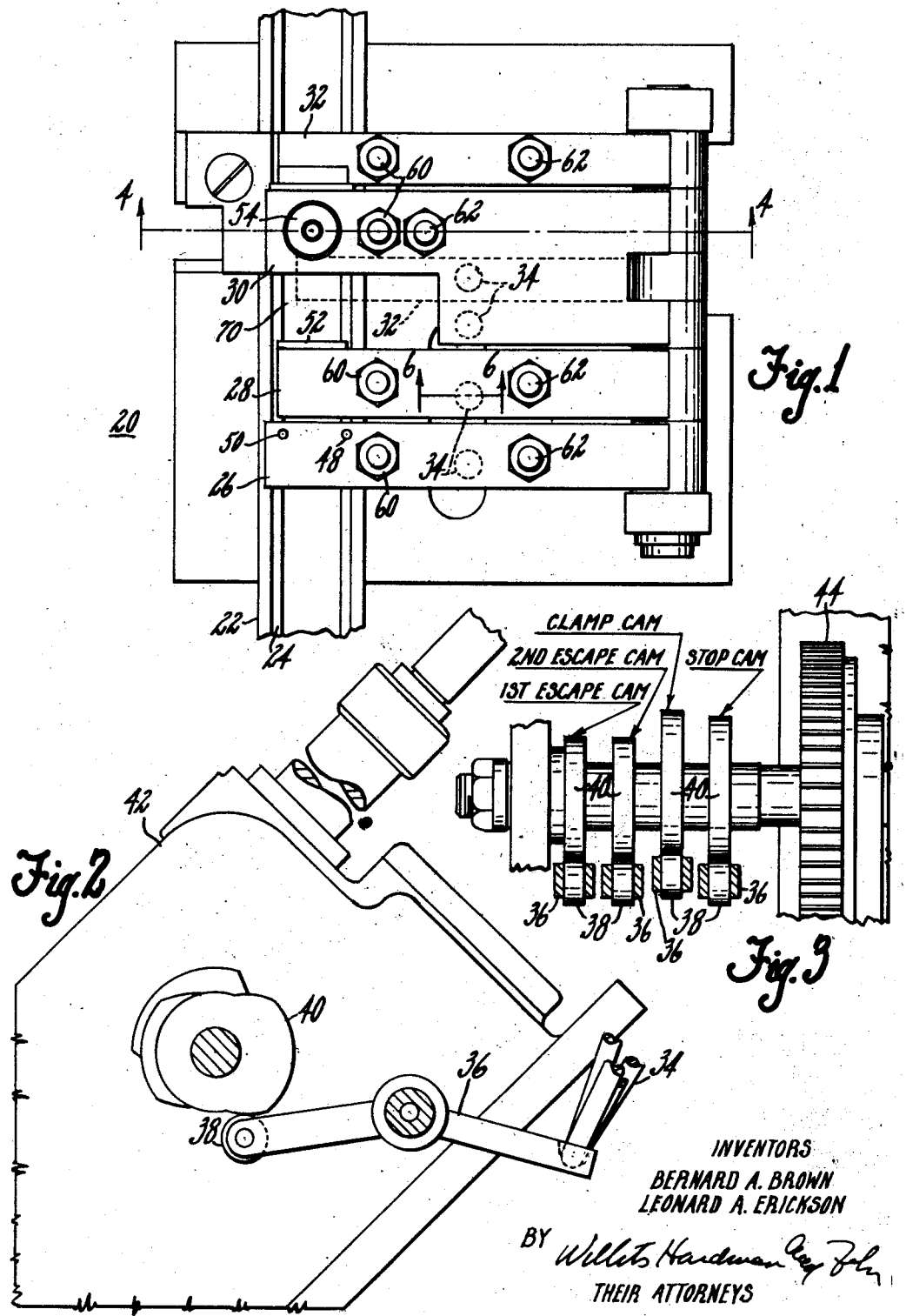

2,664,018

UNITED STATES PATENT OFFICE 2,664,018

MACHINE FOR OPERATING ON BRIQUETTES

Bernard A. Brown and Leonard A. Erickson, Dayton, Ohio, assignors to General Motors Corporation, Detroit, Mich., a corporation of Delaware Application August 18, 1950, Serial No. 180,233

3 Claims. (Cl. 77—5)

This invention relates to a delivery and clamping apparatus for machine operations and is particularly directed to fixtures for facilitating machine operations on parts formed from powdered materials, such as metal powders.

It is therefore the main object of this invention to provide an apparatus that will feed briquetted parts in timed relation to a clamping device, which device will hold the part during the machine operation and which will then eject the part and receive another part from the feeding mechanism, said sequence of operations being continuous.

In carrying out the above object, it is a further object to provide a chute for holding a supply of parts to be operated upon, which chute includes a plurality of fingers or stops that permit parts to gravitate down the chute to predetermined positions in timed relation to one another, wherein one station of said chute includes a clamping device for firmly holding the part in a definite position during a machine operation whereupon the part is ejected and another part is received in a recurring cycle of operation.

A still further object of the invention is to provide a device including four fingers or stops which control passage of parts to be machined through a chute, said fingers working in a given sequence for releasing and stopping parts sliding down the chute, said device also including one finger that acts as a clamping means for the part at the time a machine operation is being performed.

Further objects and advantages of the present invention will be apparent from the following description, reference being had to the accompanying drawings, wherein preferred embodiments of the present invention are clearly shown.

In the drawings:

Fig. 1 is a fragmentary plan view of the delivery and clamping device.

Fig. 2 is a fragmentary view of a Kingsbury head used to perform a machine operation showing the cam control (in part) for controlling the action of the fingers or stops shown in Fig. 1.

Fig. 3 is a fragmentary view of the cam timing mechanism used in connection with the Kingsbury head.

Fig. 4 is a section taken on line 4—4 of Fig. 1 and showing the extension of the drill, as carried by the Kingsbury head, at the right side thereof.

Fig. 5 is a view in section taken on line 5—5 of Fig. 4 with certain springs and the pilot removed for clarity.

Fig. 6 is a fragmentary sectional view taken on line 6—6 of Fig. 1, showing a typical application of a push rod to a finger, said push rod being actuated by the cam mechanism shown in Figs. 2 and 3.

Fig. 7 is a view taken on line 7—7 of Fig. 5.

Fig. 8 is a cam chart showing the relation between opening and closing operations of the various cams for one cycle of operation.

In application, Serial No. 180,234, filed concurrently herewith, a method for operating upon green briquettes is disclosed which requires special mechanisms in order to successfully perform machine operations on said briquettes. This is explained by the fact that such briquettes are fragile and easily chipped and/or broken. In order to perform machine operations, such as a drilling operation, it is necessary to convey the briquette, without jarring, to a fixture where it may be clamped and supported inside and out during the drilling operation. After the aperture is made, the briquette must be carefully ejected from the fixture and another briquette supplied thereto. The present invention is directed to such an apparatus which not only acts as a conveying means from a supply source but which also acts as a clamping device for holding and supporting the fragile briquette during the machine operation. The device is also a timing apparatus whereby briquettes are fed at stated intervals and are drilled or otherwise operated upon and are then ejected and another briquette is supplied to the drilling fixture. It is to be understood that in practice this device may be employed in conection with a supply bin or hopper or it may be directly connected with the output of a briquetting press so that as briquettes are made they are conveyed to a drilling station and thence to a bin to await firing or sintering as the case may be. In all instances, the present invention is not limited to any given source of supply but may be used with any suitable source.

Specifically referring to the drawings, a preferred form of the invention is shown at 20 in plan view. The device includes an inclined delivery chute 22 having a contoured slide 24 therein of a shape adapted to receive a given part (see Fig. 7) and to convey said part by gravity therealong. The progress of a part sliding down the chute 22 is controlled by a plurality of fingers or stops 26, 28, 30 and 32 which are raised and lowered through the action of associated push rods as 34, one of which is provided for each finger. The push rods 34 are actuated through lever mechanism 36, cam followers 38 and cams 40 which are operated in timed relation to a machine tool, such as a Kingsbury head 42 through gearing 44. The push rods 34 operate the fingers to raised position in timed relation to the operation of the Kingsbury head which intermittently causes the drill 46 to advance to the position shown in Fig. 4 where it is drilling a part 47 (Fig. 4) to be operated upon. The operation is performed from the bottom to permit chips to drop out by gravity and thus keep the drilled hole free at all times of said chips. It is to be understood here that instead of a drilling operation, any other machine operation can be performed which is desired and that similar control factors will be used to operate the various fingers and machine elements in timed relation to one another.

Referring specifically to Fig. 5, the various stops or fingers are shown clearly and will be explained in order. Finger 26 includes two pin stops 48 and 50 thereon; finger 28 has a downwardly extending wall 52 for a similar purpose; finger 30 includes a pilot 54 which acts as a supporting member for the part to be drilled. A lower ejector 56 is provided on finger 32, which pushes the part from tight engagement with the chute after the drilling operation and is coacting with finger 32. Finger 32 also includes a bifurcated stop member 58 thereon which fits around one side of the part and forms a nest therefor. Each of the fingers 26, 28, 30 and 32 include adjustments 60 for calibrating the clearances, etc., and each finger also has a return or follower spring 62 for causing the finger to return to position and to follow its associated push rod 34.

The drilling fixture includes a guide block 64 for the drill which also is guided in the pilot 54 by an aligned hole therein. Thus the part to be drilled is firmly held and fully supported at each side thereof during the machine operation. This is very important since unfired briquetted parts are very fragile and if no support, or inadequate support is provided, the part will flake off or crack around the drilled hole.

The cycle of operation of the fingers and drill is important to the success of the operation, this cycle being shown in the chart, Fig. 8. A supply of parts to be drilled are aligned in the chute 22 and at the start of a cycle, the finger 26 is in down position whereby the stop pins 48 and 50 prevent a part from passing. The finger 26 then lifts and the part slides into engagement with the wall 52 on finger 28, when this finger lifts, the part may slide into the nest provided by finger 32 and is clamped for drilling by finger 30 whereupon it is ejected. After the machine is in operation through a complete cycle, a part to be drilled will be adjacent each finger whereby as finger 26 lifts at 41° to permit a part to slide against another part held by finger 28, the clamping finger 30 then lifts at 99° and remains in lifted position whereupon the stop finger 32 lifts at 127° to let a finished part slide out of the fixture at 168°. While both of these fingers are in lifted position the second stop finger 28 commences to lift at 194° 51' and fully lifts at 236° 2' to let a part slide through, just prior to full opening, however the finger 32 has closed to act as a stop for the part coming into position whereupon the clamp finger 30 closes and the drilling operation commences. The finger 28 closes before the finger 26 again opens to complete the cycle. It will be noted that the part behind stop 28 in the chute 22 is in readiness for the next cycle so that there is always a part ready to slide into position through portion 70 of the chute 22. Thus the fingers open in the sequence of first, finger 26, second, finger 30, third, finger 32 and fourth, finger 28. Their sequence of closing however is first, finger 26, second, finger 32, third, finger 30 and fourth, finger 28. In this manner, parts are supplied to the fixture, clamped, drilled and ejected with a minimum of jarring or moving and without pressure from a large supply of parts held in the chute. In some cases where fragile briquetted parts are being operated upon, the stop member of finger 32 may be cushioned by the inclusion of a rubber pad cemented thereto. Also, in practice, the follower spring 62 for the clamping finger 30 is adjusted to greater pressure than are the other springs since it is apparent that the spring on the clamping finger must hold the part against the drill during the drilling operation. This adjustment may best be arrived at by trial for the specific part and drill being used. Also, in cases where excessive chips are apparent, it may be desirable to bore the plug or pilot 54 axially thereof and connect the same with an air line which is actuated upon the withdrawal of the drill for forcibly blowing out chips. This expedient is not found to be necessary in most cases since the chips generally fall out by gravity, although where large holes or holes of considerable length are being drilled, it is sometimes desirable to have a positive blowout.

The present apparatus provides a very facile device for controlling operations on a plurality of parts where said parts, due to their physical character, require special handling.

While the embodiments of the present invention as herein disclosed, constitute preferred forms, it is to be understood that other forms might be adopted.

What is claimed is as follows:

1. A delivery and operating mechanism for performing a similar machine operation on each of a plurality of work pieces of similar conformation, comprising in combination; a source of supply of pieces to be operated upon, an inclined chute connected with said source and having a contoured slide therein of a shape complementary to the shape of the pieces to be conveyed by gravity therealong, a control device associated with said chute intermediate the ends thereof and spaced from said source of supply and including a shaft, and four control fingers rotatably supported on said shaft, and individually operable for controlling the gravity progress of pieces carried by said chute, said fingers consisting of two sequentially operable stop fingers for controlling the progress of pieces carried by said chute, a holding finger including means for firmly supporting the piece during the machine operation and a nesting finger for stopping the piece when in position with respect to the holding finger, and a mechanism periodically operable to perform the machine operation on the pieces held by the holding finger, and including means associated in correlation thereto for selectively operating said fingers of the control device in a predetermined and reoccurring sequence.

2. A delivery and operating mechanism for performing an identical machine operation on each of a plurality of work pieces of similar conformation, comprising in combination; a source of supply of pieces to be operated upon, supply means connected with said source for conveying said pieces from said source to another position, a control device associated with said supply means and intermediate the termination of said means and said supply source and including a shaft, and four control fingers rotatably supported on said shaft and individually operable for controlling the progress of pieces carried by said means, said fingers consisting of two sequentially operable stop fingers for controlling the progress of pieces carried by said means, a holding finger including means for firmly supporting one of said pieces during machine operation and a nesting finger for stopping said piece when in position with respect to the holding finger, and mechanism periodically operable to perform the machine operation on the piece held by said holding finger, and including means associated in correlation thereto for selectively operating said fingers of the control device in a predetermined and recurring sequence.

3. A delivery and operating mechanism for performing a single drilling operation on each of a plurality of workpieces of similar conformation, comprising, in combination; a source of supply of pieces to be drilled, supply means associated with said source for conveying pieces from said source to a position remote therefrom, a control device associated with said means spaced from said source and from said remote position of the means and including a shaft and four control fingers rotatably supported thereon and individually operable for controlling the progress of pieces conveyed by said means, said fingers consisting of two sequentially operable stop fingers for controlling the progress of pieces conveyed by said means, a holding finger including means for firmly supporting the piece during the drilling operation and a nesting finger for stopping the piece when in position with respect to said holding finger, a Kingsbury head including a drill associated therewith and periodically operable to perform a drilling operation on the piece being held by the holding finger, and including means associated in correlation thereto for selectively operating said fingers of the control device in a predetermined and recurring sequence whereby a plurality of pieces are drilled sequentially as they are conveyed along said means.

BERNARD A. BROWN.
LEONARD A. ERICKSON.

References Cited in the file of this patent
UNITED STATES PATENTS

| Number | Name | Date |
| --- | --- | --- |
| 1,264,349 | Trundle | Apr. 30, 1918 |
| 1,570,156 | Kingsbury et al. | Jan. 19, 1926 |